Dec. 17, 1929.  W. WISHART  1,740,135
CONTROL VALVE MECHANISM
Filed July 20, 1925  2 Sheets-Sheet 1
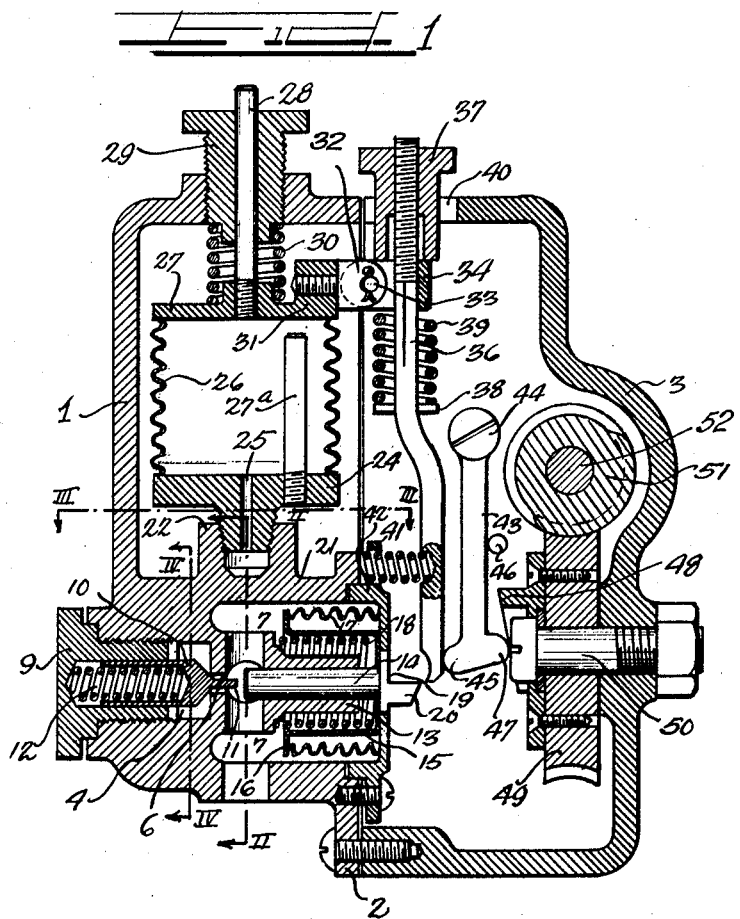
INVENTOR
William Wishart.

Dec. 17, 1929.  W. WISHART  1,740,135
CONTROL VALVE MECHANISM
Filed July 20, 1925    2 Sheets-Sheet 2
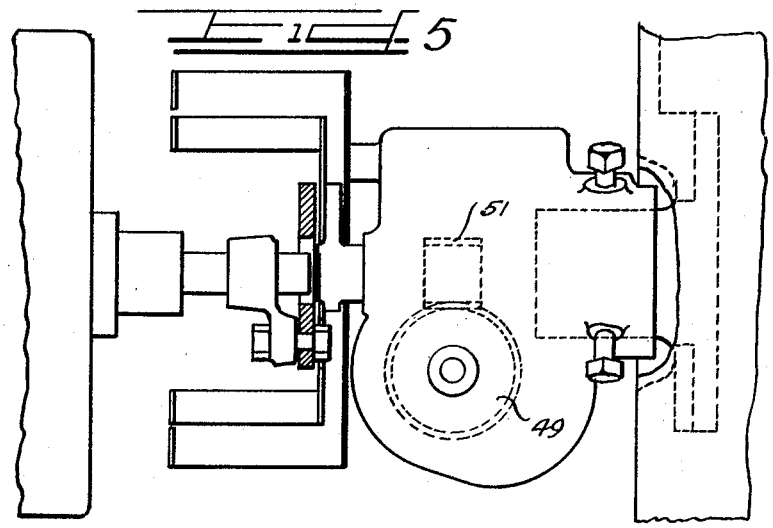
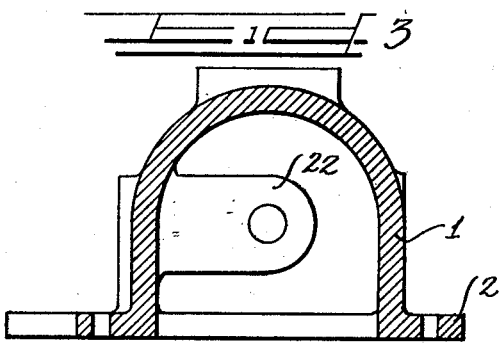
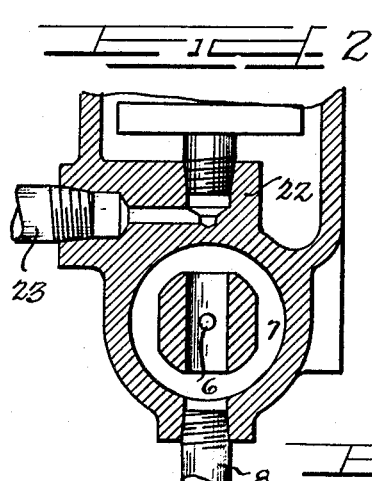
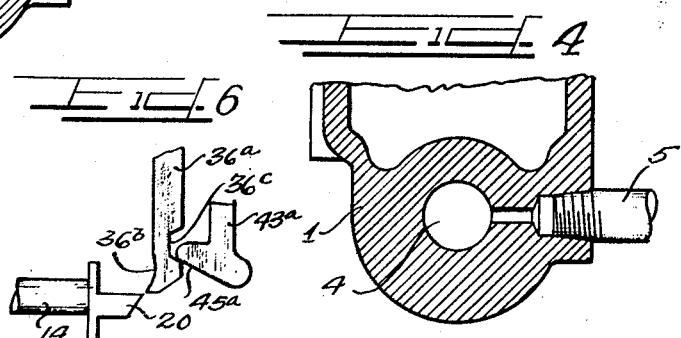
Inventor
William Wishart.
by Charles W. Niles
Attys Patented Dec. 17, 1929

1,740,135

UNITED STATES PATENT OFFICE

WILLIAM WISHART, OF CLINTON, IOWA, ASSIGNOR TO CLIMAX ENGINEERING COMPANY, A CORPORATION OF DELAWARE

CONTROL-VALVE MECHANISM

Application filed July 20, 1925. Serial No. 44,744.

This invention relates to a control valve mechanism for refrigerating apparatus and particularly to such mechanism which is adapted to automatically admit desired quantities of compressed refrigerant in accordance with the volumetric requirements of an apparatus to which said mechanism is attached.

Because of the necessarily small effective areas involved, difficulty has heretofore been experienced with valves used for the purpose mentioned, in that the freezing of a drop of water at the inlet aperture or the entrance of foreign matter therein often effects such clogging as to prevent the flow of refrigerant through said inlet and consequently renders the apparatus inoperative.

It is an important object, therefore, of this invention to provide an automatically controlled inlet valve mechanism for effectively overcoming the objectionable features found in the usual inlet or expansion valve structures.

It is a further object of this invention to provide a non-clogging inlet valve mechanism which automatically and intermittently admits desired quantities of a compressed fluid in accordance with the volumetric requirements of an apparatus utilizing such fluid.

It is another important object of this invention to provide a valve mechanism of the kind described which is controlled by differential pressures existing in an apparatus to which said mechanism is connected.

It is finally an important object of this invention to provide a mechanism of the kind described which is durable, economical and positive in operation.

Other and further important objects of this invention will be apparent from the disclosures in the specification and the accompanying drawings.

The invention—in a preferred form—is illustrated on the drawings and hereinafter more fully described.

On the drawings:

Figure 1 is a central vertical section with parts in elevation taken through a valve mechanism embodying the principles of this invention.

Figure 2 is an enlarged fragmentary section on the line II—II of Figure 1 with parts in elevation.

Figure 3 is a view similar to Figure 2 taken on the line III—III of Figure 1.

Figure 4 is a view similar to Figure 2 taken on the line IV—IV of Figure 1.

Figure 5 is a fragmentary side elevation with parts in section illustrating the method of mounting the mechanism of this invention on a refrigerating compressor.

Figure 6 is an enlarged fragmentary elevational view of a modified form of valve actuating mechanism.

As shown on the drawings:

The reference numeral 1 indicates a casing which contains a valve mechanism to be described hereinafter and which is flanged at 2 for connection with a second casing 3 containing an actuating mechanism to be described hereinafter. Said casings 1 and 3 may be secured together as shown by suitable screws extending through the flange 2 into the walls of the casing 3.

The casing 1 is provided with a chamber 4 which communicates through a suitable conduit 5 (Figure 4) with the high pressure side of a compressor such as is ordinarily used on refrigerating apparatus. Said chamber 4 is provided with a restricted inlet opening 6 which affords communication between said chamber and a second chamber 7 in the casing 1 (Figures 1 and 2). Said chamber 7 in turn communicates with the low pressure side of the refrigerating apparatus through a suitable conduit shown at 8.

Threaded in the casing 1 and extending into the chamber 4 is a hollow plug 9 which has exteriorly mounted therein a slidable valve member 10 provided with a tip 11 extending through the opening 6 into the chamber 7. The stem of said valve member 10 is hollow and has mounted therein a helical spring 12, one end of which abuts said valve member and the other end of which abuts the outer end of the recess in the hollow plug 9. Said spring 12, therefore, normally tends to hold the valve 10 in such position as to close the opening 6, with the projecting tip 11 of said valve member projecting through said opening but spaced from the walls thereof.

Integrally formed in the casing 1 and projecting into the chamber 7 is a boss 13 which has slidably mounted therein a valve actuating member 14 which is adapted to be moved to the left in Figure 1 to contact the tip member 11 of the valve 10 and unseat said valve to permit the passage of compressed refrigerant from the chamber 4 to the chamber 7. Surrounding the actuating member 14 and secured to the outer end thereof is a cup-like sealing member 15 which is flanged as shown at 16. Secured to said flange 16 and surrounding the cup-shaped member 15 is a collapsible corrugated cylindrical member 17 which extends to the inner side of the right hand wall of the chamber 7 and is secured thereto to afford a seal to prevent the escape of refrigerant from said chamber 7 into the interior of the casing 3.

The valve actuating member 14 is normally held in the position shown in Figure 1 by a helical spring 18 which is engaged between the bottom of the cup-shaped member 15 and a flange on the boss 13. Said valve actuating member 14 is also provided at its right hand end with an integral flange 19 and projecting outwardly from said flange below the axis of the valve actuating member is a flattened catch member 20 which is adapted to be engaged by an operating mechanism to be described hereinafter.

Formed in the casing 1 above the chamber 7 is an integral wall 21 which is provided with an upwardly extending boss 22, said boss 22 being recessed and the recess therein communicating with a low pressure side of the refrigerating system through the conduit 23 as clearly shown in Figure 2. Screwed in the boss 22 is a base member 24 which is provided with an axial passage 25 communicating with the recess in said boss. Supported on the base 24 is a corrugated collapsible tubular member 26, substantially a collapsible bellows which is closed at its upper end by a cover member 27. Downward movement of the cover member 27 and collapsing of the corrugated member is limited by a stop member 27ª which is screwed in the base 24 and projects upwardly therefrom. Said cover member 27 has projecting upwardly therefrom an axial stem 28 which is slidable in a plug 29 threaded in the upper end of the casing 1. Engaged between the threaded plug 29 and the cover member 27 is a helical spring 30 which tends to counteract a part of the resiliency of the corrugated cylindrical member 26 and to a degree dependent upon the axial position of the threaded plug 29.

The cover member 27 is provided with an integral boss 31 which affords a support for a bracket 32, said bracket 32 in turn affording a pivotal support at 33 for a guide bracket 34. Slidably but nonrotatably engaged in said guide bracket 34 is an arm 36 which is threaded at its upper end to receive an adjusting nut 37, the lower face of said adjusting nut 37 resting on the upper face on said guide bracket 34. Engaged between the lower face of the guide bracket 34 and a plate 38 secured to the arm 36, beneath said bracket is a helical spring 39 which tends to held said bracket and said arm in adjusted relation depending upon the axial position of the nut 37. The arm 36, of course, swings about the pivot point 33 and this swinging movement is permitted by the provision of an opening 40 in the casing 3 surrounding the adjusting nut 37. The arm 36 is normally held in vertical position as shown in Figure 1 by means of a helical spring 41 having one end engaged in a boss in the face of said arm and the other end abutting wall member 21 and engaged through an integral guide portion 42 formed in the casing 3.

Means are provided for swinging the arm 36 back and forth in the casing 3 about the pivot point 33. For this purpose an arm member 43 is pivotally mounted in the casing 3 at 44 and is provided at its lower end with a rounded projecting face portion 45 which contacts the right hand side of the lower end of the arm 36. Movement of said swinging arm 43 in a counterclockwise direction is limited by a stop 46 mounted in the casing 3. The lower end of said swinging arm 43 is also provided with a projecting face 47 on the side thereof opposite to the face 45 and said face 47 slidably contacts a cam 48 which is secured to a worm wheel 49 pivoted inside the casing 3 on a suitable stub shaft 50. The worm wheel 49 is driven by a worm pinion 51 which is preferably mounted on the compressor drive shaft as indicated at 52 in Figure 1. The relative positions of said worm and worm wheel are also clearly shown in Figure 5.

In Figure 6 I have shown a slightly modified form of valve actuating mechanism wherein lever 36ª corresponding to the swinging lever 36 is provided with a concave lower face 36ᵇ for engagement with the catch projection 20 of the valve actuating member 14. The right hand or inner side of said lever 36ª is provided with a depression 36ᶜ which is adapted to receive a projecting portion 45ª formed on a swinging arm 43ª used in lieu of the swinging arm 43, previously mentioned. By virtue of the concave face 36ᵇ and the depression 36ᶜ the engagement of the lower end of the swinging arm 36ª with the catch member 20, when the valve is to be actuated, is made more positive which is desirable under certain conditions of operation.

The operation is as follows:

The valve member 10 is normally held by the spring 12 in such a position as to maintain the opening 6 closed and to prevent the flow of compressed refrigerant from the high pressure side of the system, that is, the chamber 4, to the low pressure or expansion side, the chamber 7. Said valve member 10 can only be opened by movement of the valve actuating member 14 to the left in Figure 1 and the manner in which this opening movement can be accomplished will now be described.

The cam member 48 which is continuously driven from the worm wheel 49 through rotation of the worm 51 from the compressor drive shaft acts to cause the swinging arm 43 to swing backward and forward about the pivot point 44. This swinging movement of the arm 43 is transmitted to the arm 36 which is caused to swing backward and forward about the pivot point 33, the return movement thereof being effected by the helical spring 41. The lower end of the swinging arm 36 normally clears the upper face of the catch member 20 and consequently the swinging movement thereof normally does not act to move the member 14 to the left to open the valve 10. However, when the pressure on the low side of the system reaches a predetermined point the collapsing of the corrugated member 26 due to such lowering of pressure (the exterior of said collapsing member being, of course, subjected to substantially atmospheric pressure) will move the arm 36 downwardly to such a point that the lower end thereof will engage with the upper face of the catch member 20 thereby transmitting the swinging movement of the arm 36 to the valve actuating member 14 to cause engagement thereof with the tip 11 on the valve member 10 and to open said valve to permit refrigerant under pressure to be admitted into the chamber through the opening 6. As soon as this compressed refrigerant is admitted into the chamber 7, expansion thereof begins and the pressure on the low pressure side is increased causing an expansion of the corrugated member 26 and a consequent upward movement of the arm 36. This upward movement, of course, causes the lower end of the arm 36 to again swing clear of the upper face of the catch member 20 rendering the valve actuating member 14 again inoperative and permitting the valve member 10 to be closed under the influence of the helical spring 12.

It will be apparent that the action just recited will be automatically repeated whenever the pressure in the low pressure side of the refrigerating apparatus drops to a predetermined point. Consequently compressed refrigerant is supplied from the compressor or a storage container to the low pressure side of the apparatus exactly in accordance with the volumetric requirements of the apparatus.

It will be noted that the connection from the low pressure side of the system to the interior of the corrugated collapsible member 26 is not a direct one but rather through conduit 23. This is to prevent too rapid action although it is evident that under certain conditions a direct connection from the chamber 7 to the interior of the corrugated member might be used.

The point at which the valve actuating mechanism is rendered operative may be adjusted through actuation of the adjusting nut 37 and the action of the helical spring 30 in opposition to the resiliency of the corrugated member 26 may, of course, be adjusted through the adjusting nut or plug 29.

Similar rotation of the plug 9 may serve to adjust the degree of compression exerted by the helical spring 12.

It will thus be apparent that I have provided a mechanism which supplies compressed refrigerant to the system in accordance with differential conditions existing therein. This mechanism is durable, capable of simple adjustment and is positive in operation. Due to the relatively large inlet opening 6 and to the fact that the tip member 11 of the valve projects entirely through said opening, there is no danger of the inlet opening clogging through freezing therein or through introduction of foreign matter with the compressed refrigerant.

I am aware that numerous details of construction may be varied through a wide range without departing from the principles of this invention, and I therefore do not purpose limiting the patent granted, otherwise than necessitated by the prior art.

I claim as my invention:

1. In combination with a casing, a valve member therein, an oscillatable member, means for actuating said member, a swingable member abutting said oscillatable member, means for bringing said swingable member into position for operating said valve, said means including a collapsible bellows, a bracket on said bellows, and a second bracket pivoted to said first mentioned bracket and engaging said swingable member.

2. In combination with a casing, a valve therein, means normally ineffective for opening said valve, said means including an oscillatable member, means for actuating said member, a swingable member abutting said oscillatable member and having an end extending through said casing, a plug threaded on said end, means for rendering said ineffective means effective including a collapsible bellows, means connecting said bellows with said swingable member, and resilient means on said swingable member to hold said means in abutment with said plug.

In testimony whereof I have hereunto subscribed my name.

WILLIAM WISHART.